Jan. 15, 1952  J. R. RAUHUT  2,582,356
VENTILATING DEVICE
Filed Oct. 30, 1947  3 Sheets-Sheet 1

INVENTOR
JOHN R. RAUHUT
BY
Joshua R. H. Potts
HIS ATTORNEY

Jan. 15, 1952  J. R. RAUHUT  2,582,356
VENTILATING DEVICE
Filed Oct. 30, 1947  3 Sheets-Sheet 2
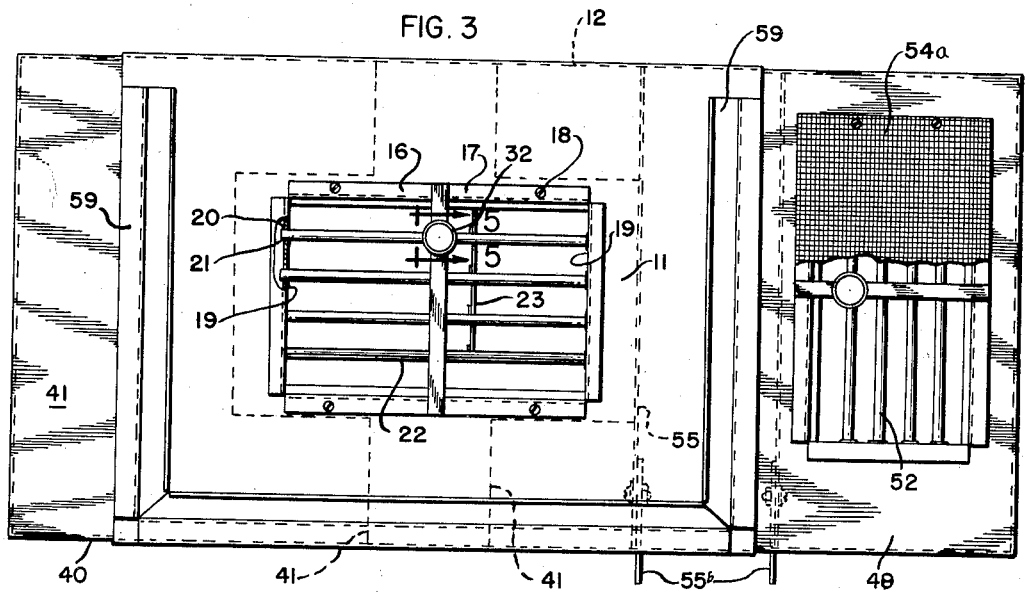
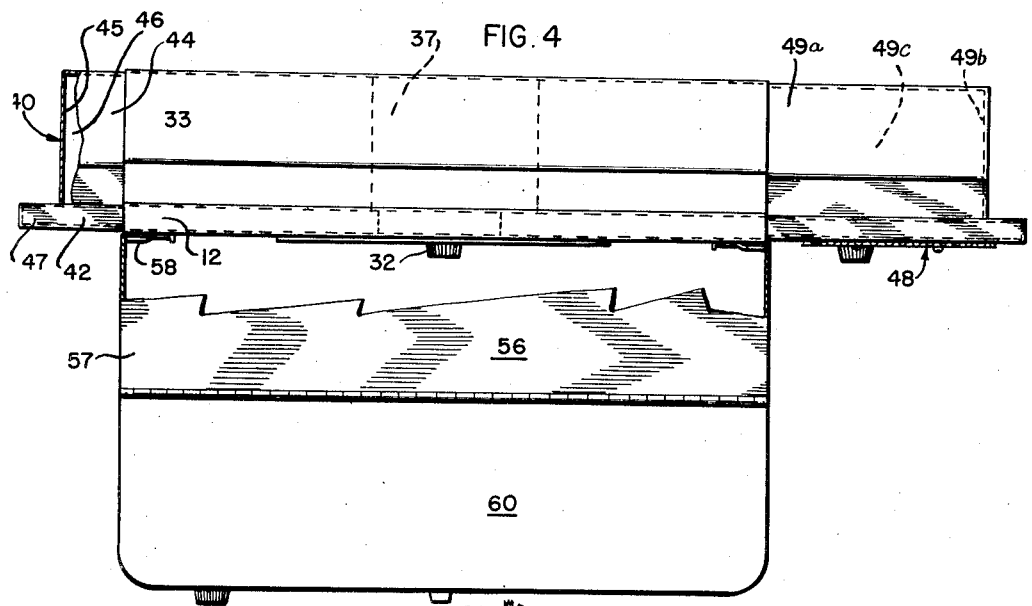
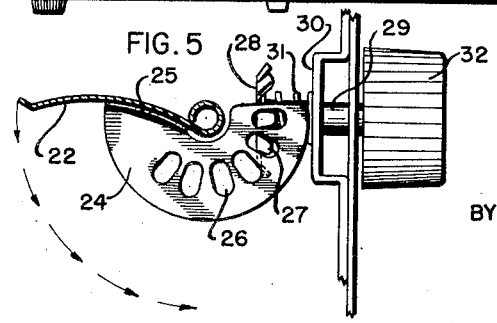
INVENTOR
JOHN R. RAUHUT
BY
Joshua R. H. Potts
HIS ATTORNEY Jan. 15, 1952 J. R. RAUHUT 2,582,356
VENTILATING DEVICE
Filed Oct. 30, 1947 3 Sheets-Sheet 3
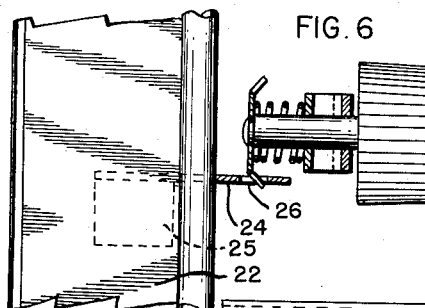
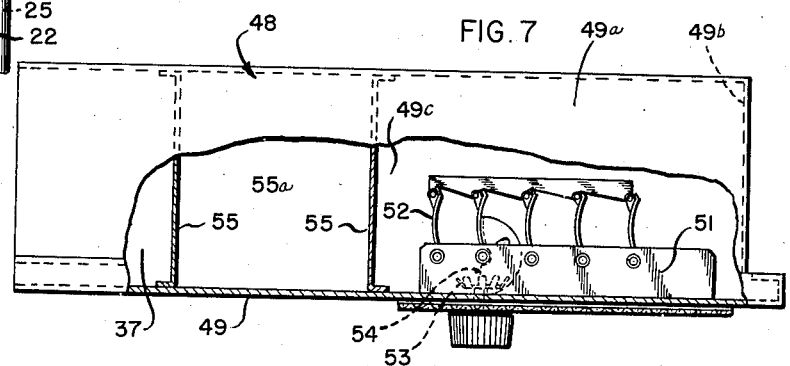
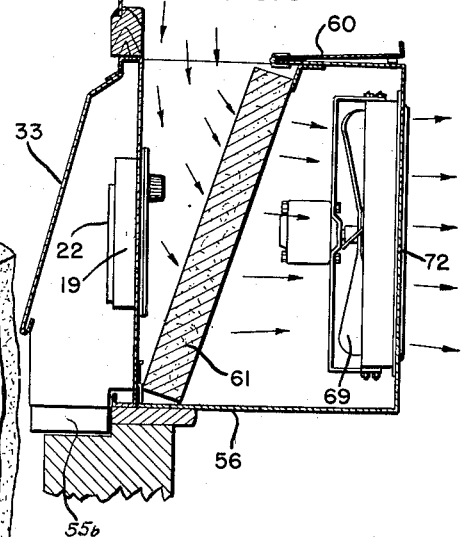
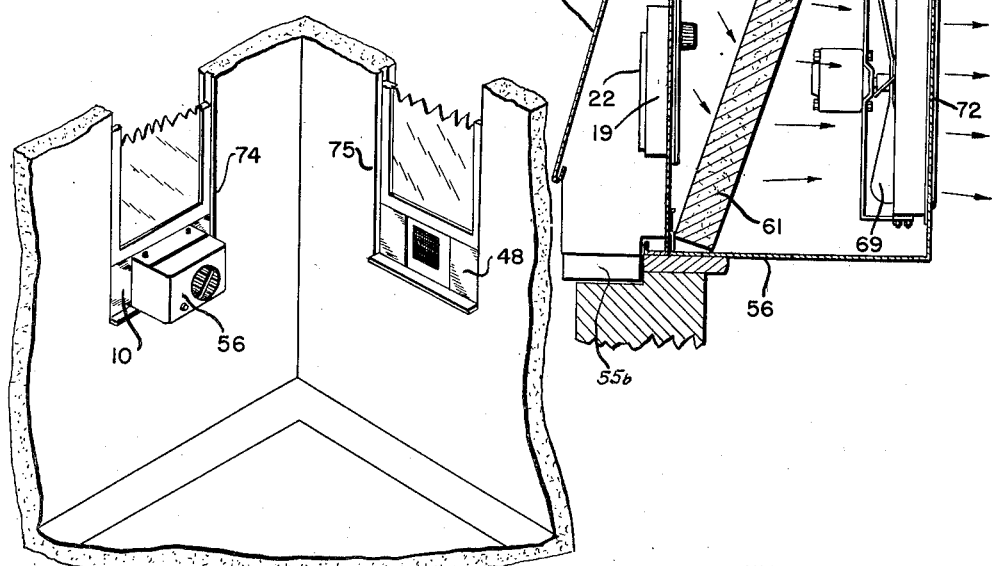
INVENTOR
JOHN R. RAUHUT
BY
Joshua R. H. Potts
HIS ATTORNEY Patented Jan. 15, 1952

2,582,356

UNITED STATES PATENT OFFICE 2,582,356

VENTILATING DEVICE

John R. Rauhut, Chicago, Ill.

Application October 30, 1947, Serial No. 783,206

4 Claims. (Cl. 98—94)

This invention relates to ventilating devices and has for an object the provision of new and improved devices of this character.

Another object of the invention is the provision of ventilating units of a character which may be placed in a window opening, wherein means are provided for controlling incoming air and outgoing air, and wherein streams of incoming and outgoing air are segregated one from the other.

Still another object of the invention is to provide a ventilating unit having an air collection means adapted to be safely exposed to the weather, and which excludes rain water and foreign matter from incoming air.

A further object of the invention is to provide in combination with a ventilating unit, means for inducing rapid intake of air therethrough, in order to build up a slight pressure in the space to be ventilated, to thereby hasten ventilation and venting of devitalized air, and increase the circulation of air within the said space to be conditioned.

Another object of the invention is to provide means wherein the incoming air may be diverted in a variety of directions, to avoid drafts, insure distribution of incoming air, and avoid collections of devitalized air in segregated areas in the space to be ventilated.

A still further object of the invention is to provide in constructions of this character, means by which the ventilating units may be adjusted or converted to fit windows or other openings of various kinds and sizes.

Figure 1:
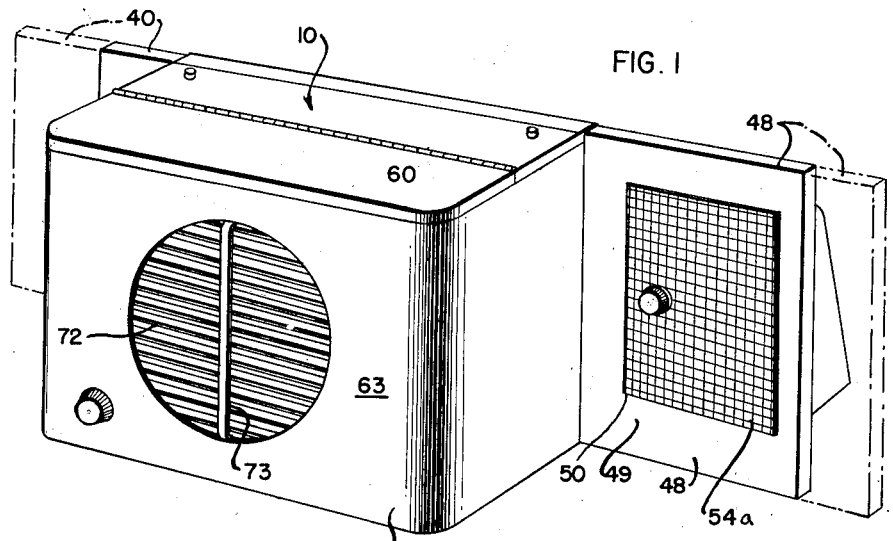
Figure 2:
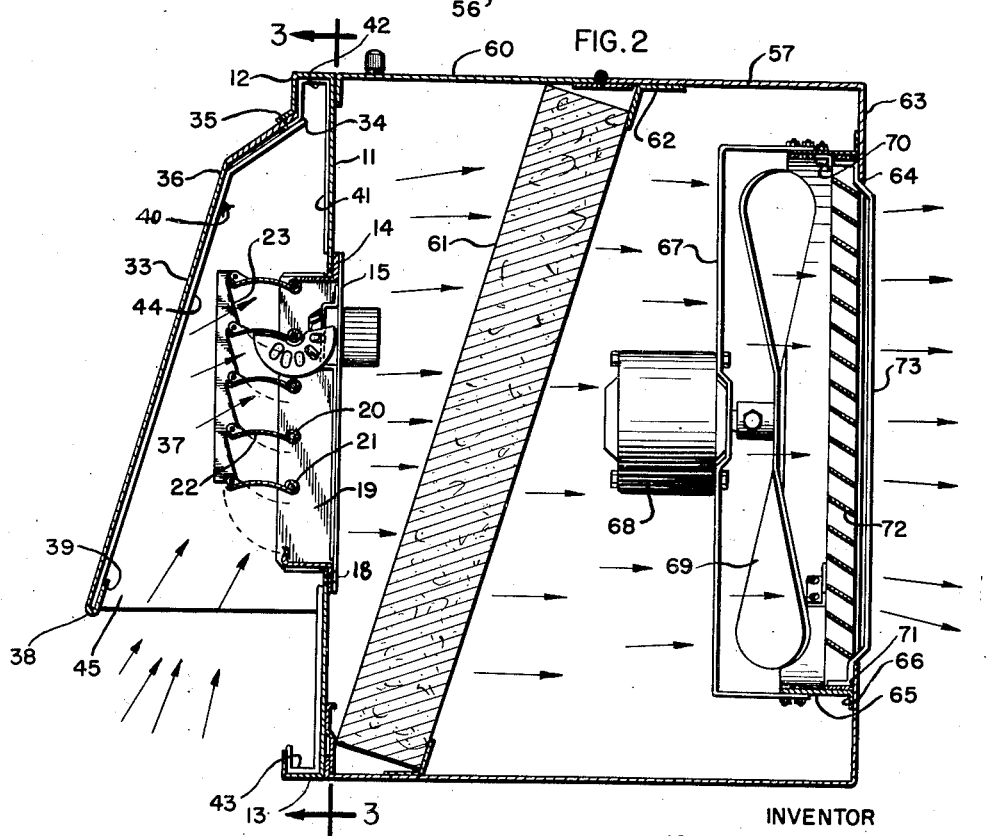

Other and further objects of the invention will appear from the specification and claims hereinafter following, and from the accompanying drawings, in which:

Figure 1 is a perspective view of an embodiment of the invention,

Figure 2 is a composite, enlarged, vertical sectional view of the invention, taken centrally transversely through, and looking toward the left of the construction shown in Figure 1, Figure 3 is a front elevational view of the ventilating unit proper, corresponding substantially to the line 3—3 of Figure 2, with the induction unit detached therefrom, Figure 4 is a top plan view of the construction shown in Figure 3, Figure 5 is a fragmentary, enlarged, top plan, part sectional, view of louver mechanism employed in connection with the invention, taken on the line 5—5 of Figure 3, Figure 6 is a fragmentary side elevational view of the louver mechanism shown in Figure 5, Figure 7 is a fragmentary, top plan view, partly in section, and showing the louver construction used in connection with the venting provision, Figure 8 is a reduced transverse vertical sectional view, similar to Figure 2, and showing the ventilating device employed as an air circulator, while Figure 9 is a perspective view of a fragment of an enclosure, showing application of the ventilating means when converted for very small windows.

As shown in the drawings, the ventilator is adapted to be placed in an opening in the wall of a room or in a window. An embodiment of the invention comprises what may be termed a foundation or key unit 10. This unit (best shown in Figures 1, 2 and 3) includes a flat sheet metal wall section 11, preferably oblong rectangular in shape, with its opposite long margins bent into channel formations 12 and 13. The wall section 11 is cut out to form an oblong recess 14, into which is fitted a louver carrying unit or closure means 15. This unit includes a frame 16 of a size to fit within the opening 14, and is provided with flanges 17 overlapping the wall section 11, and may be detachably secured thereto by screws 18. The frame members of the frame 16 extend a considerable distance beyond the opposite side of the wall section 11, and the side members 19—19 are provided with apertures 20 into which projections 21 of louvers 22 are pivoted, the louvers 22 being connected by pivoted links 23 for operation in unison. One of the louvers 22 has attached thereto, a gear 24. The gear 24 is preferably made up of sheet metal, having an angular part 25, welded to the louver, and a vertically disposed part provided with a plurality of tapered openings 26. Adapted to mesh with the openings 26 are the inclined teeth 27 of a pinion 28, formed from sheet metal, the pinion 28 being carried by a shaft 29, rotatably mounted in a support 30, fixed to the frame 16, a coiled spring 31 being interposed between the support and the pinion 28 to insure snug fit and take up wear, and a knob 32 being provided for rotating the shaft 29.

The present invention has a hood which is comprised of a hood section 33 and a pair of hood sections 44 which will be subsequently described. Spaced from the wall section 11 and having one end dependingly supported therefrom is the hood section 33, having an upper flat edge 34 disposed beneath a flat extension 35 on the channel formation 12, and welded thereto. This hood section is exposed to the weather and by reason of the manner in which it is arranged beneath the extension 35, it is sealed against the entrance of rain. The hood section 33 is curved, as at 36, and diverges downwardly with reference to the section 11 and together with the wall 11 forms an inlet compartment or chamber 37. The other end of the hood section 33 terminates somewhat short of the lower end of the section 11, as at 38, and is turned inwardly to provide a groove 39.

Cooperating with the main section 10, as described, are end extension closures, indicated at 40, one only being shown in detail, as in Figures 1, 2, 3 and 4. The end closures 40, in one form of the invention, are alike, and each comprises a front wall or plate 41 extending transversely from one side of the main section 10 and contiguous with one end thereof. The plate 41 has upper and lower channel-shaped formations 42 and 43 of a size to slidably fit within the channel formations 12 and 13 of the unit 10. Welded to an extension of the formation 42 is a hood section 44, this hood section being of such size that it will snugly slide beneath the hood section 33 for movement toward and away from the latter. The lower edge of the hood section 44 is seated in the groove 39. An end wall 45 closes the end of the end closure 40, and with the front wall or plate 41 and hood section 44, provides a chamber 46, which communicates with the chamber 37 of the main section 10. Outwardly of the end wall 45, the end, top and bottom edges of the front wall 41 are finished by a hollow formation 47. The inner portion of the wall 41 of each end section 40, is cut-out to clear the frame 16, and extended to provide reinforcement for the unit. Thus far described, and with a second end closure 40, of the kind already mentioned, closing the opposite end of the main unit 10, there is provided a foundation unit, including the unit 10 and end closures 40, which is adjustable for windows of different sizes, by extending or retracting the end closures 40 with reference to the unit 10. This construction provides an efficient and weather-proof ventilator, in which quantities of exterior air are collected, and wherein the louvers 22 may be minutely adjusted to control the amount of incoming air.

The foundation unit 10, however, is adapted to cooperate with a venting unit 48, which may take the place of one of the end closures 40. The venting unit 48 is similar in construction to one of the end closures 40, having a front wall or plate 49, provided with channel formations at its top and bottom edges, a hood section 49a, and an end wall 49b, all slidably cooperable with the channel formations and hood section of the main section 10, in the same manner as one of the end closures 40, the wall 49, hood 49a and end wall 49b together defining an exhaust chamber 49c. The unit 48 additionally is provided in the front wall 49 thereof, with a vertically elongated opening 50, adapted to receive a vertically elongated frame 51, similar to the frame 16. Vertically disposed louvers 52 are mounted in the frame 51, pivotally connected together, and operable by a gear 53 and pinion 54, of the character already described. A screen 54a is disposed over the opening 50. As best shown in Figures 2, 3 and 7, extending between the wall 49 and the hood 49a, is a pair of partition plates or walls 55, arranged in spaced parallel relation with respect to each other and defining a dead air space 55a. The walls 55 are provided with extensions 55b, adapted to increase the length of the walls 55 in certain cases where window sills vary in depth. It will be apparent that the exhaust chamber 49c, formed in the unit 48, is thus completely cut off from communication with the inlet chamber 37 formed in the unit 10, and the other end closure 40, so that incoming and outgoing streams of air are segregated one from the other, though the size of the apparatus may be adjusted to window openings of different extents, in a manner already pointed out.

Cooperable with the main section is a self-contained unit, indicated generally at 56. This unit includes an open-ended housing 57 having its margins flanged, as at 58 for slidable engagement with keepers 59 fixed to the wall section 11, as best shown in Figure 4. The housing 57 also has a top provided with an opening therein. Pivotally mounted on the top of the housing and adapted to cover and uncover the opening is a hinged door 60, which may be opened and closed for a purpose presently to appear. Supported in the housing 57, preferably in the inclined position shown, is a filter 61, held in place by brackets 62.

The outer wall 63 of the housing 57 is provided with an aperture 64, and in line with the aperture 64 is a tube 65 having an out-turned flange 66, welded to the wall 63. The inner end of the tube 65 carries a bracket 67, supporting a motor 68, which drives a suction fan 69. Between the wall defining the aperture 64 and a series of brackets 70 secured to the inner surface of the tube 65, is rotatably supported a ring 71. The ring 71 carries a plurality of louver elements 72 arranged in end to end spaced overlapping relation with respect to each other, a handle 73 being provided by which the louver carrying ring 71 may be rotated.

As best shown in Figure 8, the door 60 may be opened, and the louvers 22 adjusted, so that air within the space to be ventilated, may be recirculated and fresh air admitted to the recirculated air in any quantities desired.

Referring to Figure 9, when the windows in an enclosure are too small to receive the combined inlet units, comprising the foundation unit 10 and venting unit 48, the foundation unit 10, plus the housing 57, and associated parts already described, may be placed in one window 74, as shown, and the venting unit 48 placed in another window 75, the latter unit in this case being provided with an end closure 40 adjustably meeting with the venting unit 48, as will be understood.

In operation, the foundation unit 10, without more, may be placed in a partial window opening, so that the hood section 33 extends outside, the latter serving to collect outside air in the chamber 37 and direct the same to the adjustable louvers 22, which may be adjusted with almost micrometer accuracy, by manipulation of the knob 32. With the venting unit 48 in place, the streams of incoming and vented air are separated by the partitions 55, and the amount of vented air may be closely adjusted by manipulation of the louvers 52. With the unit 56 in place, the incoming air is speeded up by the suction fan 69, and directed through the inclined louvers 72, which carried by the ring 71, may be adjusted to direct the air in any direction desired to avoid drafts, and also to prevent incoming air joining outgoing air before serving its purpose in revitalizing the air of the space to be conditioned. The provisions already described, merely by opening the door 60, are connected to a recirculating assembly into which fresh air may be liberally or meagerly mixed, depending upon conditions encountered. In all cases the portions of the assembly are interengaged in such manner that they may be adjusted to fit different sized window openings, and the various units coordinated to meet varying conditions.

While I have illustrated and described the preferred form of construction for carrying my invention into effect, this is capable of variation and modification without departing from the spirit of the invention. I, therefore do not wish to be limited to the precise details of construction set forth, but desire to avail myself of such variations and modifications as come within the scope of the appended claims.

Having described my invention I claim:

1. In a ventilator adapted to be placed in an opening in the wall of a room, an open ended housing having a top positioned in said opening in said wall, said top of said housing being provided with an opening therein adjacent one open end of said housing, said one open end of said housing being adapted to receive incoming air from the atmosphere outside of said room, closure means positioned in said one open end of said housing and secured to the adjacent portion of said housing for opening and closing said one open end of said housing, a fan positioned within said housing intermediate the ends thereof and secured thereto, said fan being adapted to increase the velocity of the incoming air entering through said one open end of said housing and project it at a greater velocity through the other open end of said housing and into said room, a plate extending from one side of said housing and positioned in said opening in said wall, said plate being provided with an opening therein to serve as an outlet for the outgoing air in said room, a hood positioned over said one open end of said housing and said plate and having one end dependingly supported from said housing and said plate, the other end of said hood being spaced from said housing and said plate, a partition plate positioned within said hood between said one open end of said housing and said opening in the first named plate and secured to said first named plate and said hood, said partition plate serving to separate the air going into said room from the air going out of said room, said one open end of said housing and said partition plate and the adjacent portion of said hood forming an inlet chamber to collect outside air and direct it into said one open end of said housing, said first named plate and said partition plate and the adjacent portion of said hood forming an exhaust chamber for air going out of said room, and a door positioned over said opening in said top of said housing and pivotally connected to the latter and adapted to uncover said opening in said top of said housing to permit ingress of room air into said housing and out said other open end of said housing and into said room for recirculation.

2. In a ventilator adapted to be placed in an opening in the wall of a room, an open ended housing positioned in said opening in said wall, one open end of said housing being adapted to receive incoming air from the atmosphere outside of said room, a fan positioned within said housing intermediate the ends thereof and secured thereto, said fan being adapted to increase the velocity of the incoming air entering through said one open end of said housing and project it at a greater velocity through the other open end of the latter and into said room, a plurality of louver elements arranged in end to end spaced overlapping relation with respect to each other and fixedly secured together and rotatably supported in said other open end of said housing and directing the incoming air from said fan into said room away from the outgoing air in said room to prevent the incoming air from becoming stale before it conditions the air within said room, a plate extending from one side of said housing and positioned in said opening in said wall, said plate being provided with an opening therein to serve as an outlet for the outgoing air in said room, a hood positioned over said one open end of said housing and said plate and having one end dependingly supported from said housing and said plate, the other end of said hood being spaced from said housing and said plate, and a partition plate positioned within said hood between said one open end of said housing and said opening in the first named plate and secured to said first named plate and said hood, said partition plate serving to separate the air going into said room from the air going out of said room, said one open end of said housing and said partition plate and the adjacent portion of said hood forming an inlet chamber to collect outside air and direct it into said one open end of said housing, said first named plate and said partition plate and the adjacent portion of said hood forming an exhaust chamber for air going out of said room.

3. In a ventilator adapted to be placed in an opening in the wall of a room, an open ended housing positioned in said opening in said wall, one open end of said housing being adapted to receive incoming air from the atmosphere outside of said room, a fan positioned within said housing intermediate the ends thereof and secured to said housing, said fan being adapted to increase the velocity of the incoming air entering through said one open end of said housing and project it at a greater velocity through the other open end of said housing and into said room, a plate positioned in said opening in said wall and extending from one side of said housing for slidable movement transversely of said housing, said plate being provided with an opening therein to serve as an outlet for the outgoing air in said room, a hood divided into a pair of hood sections intermediate its ends and one of said hood sections being positioned longitudinally within the other of said hood sections for slidable movement toward and away from said other of said hood sections, said other of said hood sections being positioned over said one open end of said housing and having one end dependingly supported from said housing, said one of said hood sections being positioned over said plate and having one end dependingly supported from said plate, the other ends of said hood sections being spaced from said housing and said plate, said hood being divided into sections to permit adjustment of said ventilator to any size opening in the wall of a room, and a partition plate positioned within said one of said hood sections between said one open end of said housing and said opening in the first named plate and secured to said first named plate and said one of said hood sections, said partition plate serving to separate the air going into said room from the air going out of said room, said one open end of said housing and said partition plate and the adjacent portion of said hood forming an inlet chamber to collect outside air and direct it into said one open end of said housing, said first named plate and said partition plate and the adjacent portion of said hood forming an exhaust chamber for air going out of said room.

4. In a ventilator adapted to be placed in an opening in the wall of a room, an open ended housing positioned in said opening in said wall, one open end of said housing being adapted to receive incoming air from the atmosphere outside of said room, a fan positioned within said housing intermediate the ends thereof and secured to said housing, said fan being adapted to increase the velocity of the incoming air entering through said one open end of said housing and project it at a greater velocity through the other open end of said housing and into said room, a plate positioned in said opening in said wall and extending from one side of said housing for slideable movement transversely of said housing, said plate being provided with an opening therein to serve as an outlet for the outgoing air in said room, a hood divided into a pair of hood sections intermediate its ends and one of said hood sections being positioned longitudinally within the other of said hood sections for slidable movement toward and away from said other of said hood sections, said other of said hood sections being positioned over said one open end of said housing and having one end dependingly supported from said housing, said one of said hood sections being positioned over said plate and having one end dependingly supported from said plate, the other ends of said hood sections being spaced from said housing and said plate, said hood being divided into sections to permit adjustment of said ventilator to any size opening in the wall of a room, and a pair of partition plates arranged in spaced parallel relation with respect to each other and positioned within said one of said hood sections between said one open end of said housing and said opening in the first named plate and secured to said first named plate and said one of said hood sections, said partition plates forming a dead air space between them and serving to separate the air going into said room from the air going out of said room, said one open end of said housing and the adjacent one of said partition plates and the adjacent portion of said hood forming an inlet chamber to collect outside air and direct it into said one open end of said housing, said first named plate and the adjacent other of said partition plates and the adjacent portion of said hood forming an exhaust chamber for air going out of said room.

JOHN R. RAUHUT.

REFERENCES CITED

The following references are of record in the file of this patent:

UNITED STATES PATENTS

| Number | Name | Date |
|---|---|---|
| 1,200,302 | Bohem | Oct. 3, 1916 |
| 1,806,847 | Frederick | May 26, 1931 |
| 1,916,907 | Sargent | July 4, 1933 |
| 1,946,887 | Sipe | Feb. 13, 1934 |
| 2,010,808 | Braine | Aug. 13, 1935 |
| 2,029,406 | Birkholz | Feb. 4, 1936 |
| 2,052,453 | Dollinger | Aug. 25, 1936 |
| 2,055,621 | Chamberlin | Sept. 29, 1936 |
| 2,118,282 | Will | May 24, 1938 |
| 2,179,541 | Burke | Nov. 14, 1939 |
| 2,204,401 | Butler | June 11, 1940 |
| 2,240,406 | Kurtz | Apr. 29, 1941 |
| 2,322,904 | Williams | June 29, 1943 |
| 2,359,571 | McLenegan | Oct. 3, 1944 |
| 2,373,496 | Paiste, Jr. | Apr. 10, 1945 |
| 2,388,734 | Funk | Nov. 13, 1945 |
| 2,439,444 | Babcock et al. | Apr. 13, 1948 |